United States Patent [19]

Haen et al.

[11] Patent Number: 4,986,254
[45] Date of Patent: Jan. 22, 1991

[54] BAR BURNER

[75] Inventors: William G. Haen; Earle L. Pfefferkorn, both of Racine, Wis.

[73] Assignee: Greene Manufacturing Co., Racine, Wis.

[21] Appl. No.: 548,507

[22] Filed: Jul. 2, 1990

[51] Int. Cl.$^5$ ............................ A47J 37/00; F24C 3/00
[52] U.S. Cl. .................................. 126/41 R; 126/39 R; 431/354; 239/559
[58] Field of Search ................. 126/41 R, 25 R, 39 R, 126/39 C, 39 K, 39 E; 239/559; 431/354

[56] References Cited

U.S. PATENT DOCUMENTS

| | | | |
|---|---|---|---|
| 2,044,528 | 6/1936 | Guhl | 113/116 |
| 2,600,656 | 6/1952 | Jensen et al. | 126/39 R |
| 2,794,496 | 6/1957 | DuFault et al. | 431/354 |
| 3,295,509 | 1/1967 | Harvey | 126/25 R |
| 3,363,845 | 1/1968 | Pierce | 239/559 |
| 3,501,098 | 3/1970 | Evans | 239/561 |
| 3,538,908 | 11/1970 | Well | 126/39 R |
| 3,626,923 | 12/1971 | Martin | 126/41 R |
| 4,346,845 | 8/1982 | Meyerhoff et al. | 239/418 |
| 4,418,456 | 12/1983 | Riehl | 29/157 |
| 4,458,663 | 7/1984 | Kanesaka | 106/85 |
| 4,485,972 | 12/1984 | Freber | 239/553.3 |
| 4,593,676 | 6/1986 | Wackerman | 126/41 R |
| 4,676,221 | 6/1987 | Baynes et al. | 126/41 R |
| 4,886,083 | 12/1989 | Homer | 126/36 R |

FOREIGN PATENT DOCUMENTS 1325436  8/1973  United Kingdom .

Primary Examiner—James C. Yeung
Attorney, Agent, or Firm—Peter N. Jansson

[57] ABSTRACT

An improved bar burner is provided for use in a cooking grill having a top cooking area. The bar burner includes an elongate body having a pair of curved ends and a pair of substantially parallel sidewalls extending between the curved ends. A plurality of holes is distributed along each side wall for flowing combustible gas from the interior to the exterior of the body. Each curved end also has a plurality of holes for flowing gas to the exterior of the body. The holes in each curved end are arranged to define an end zone and a pair of angularly facing side zones. The holes in the side zones have enlarged cross-sectional areas, thereby providing improved heat rejection. The cross-sectional areas of the holes defining the angularly facing side zones are generally equal to one another and greater than the cross-sectional areas of the holes distributed along each side wall and in the end zones. When used in a rectangular burner kettle, the flames at the angularly facing side zones reject heat toward the kettle corners to more nearly equalize the temperature across the top cooking area. Several preferred embodiments are disclosed.

11 Claims, 4 Drawing Sheets

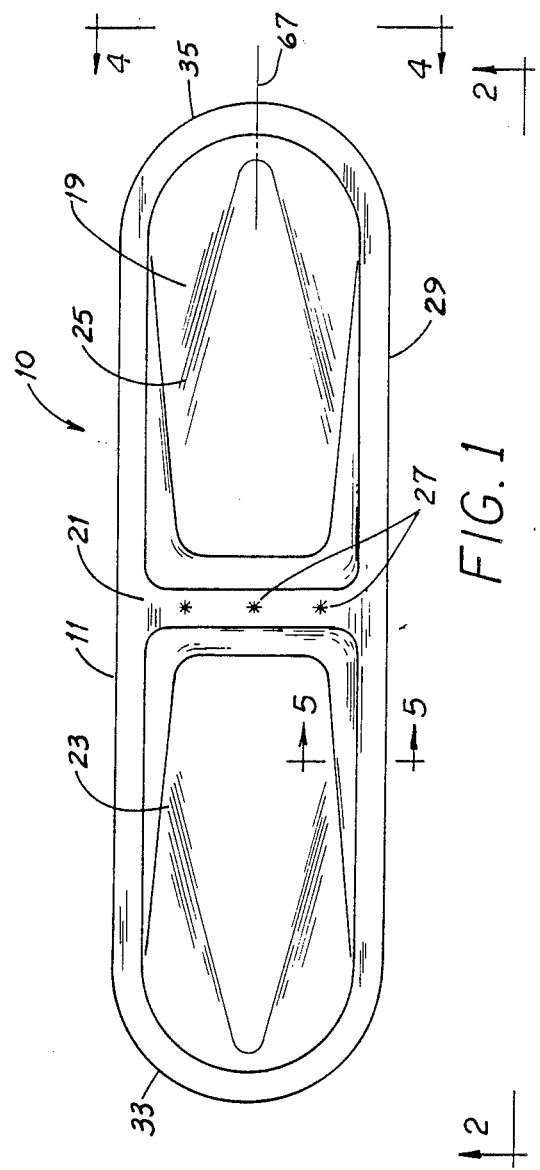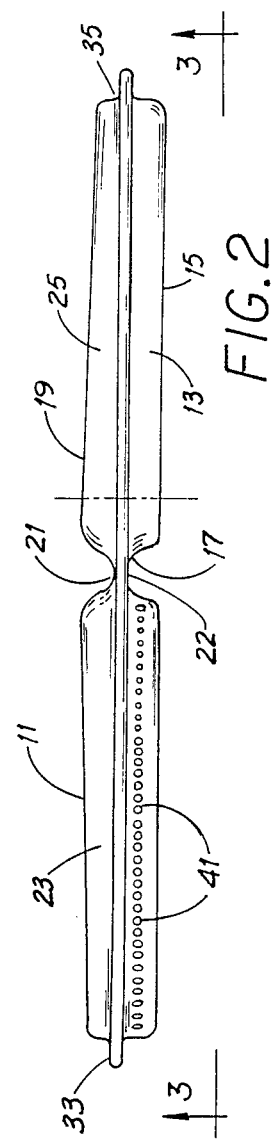

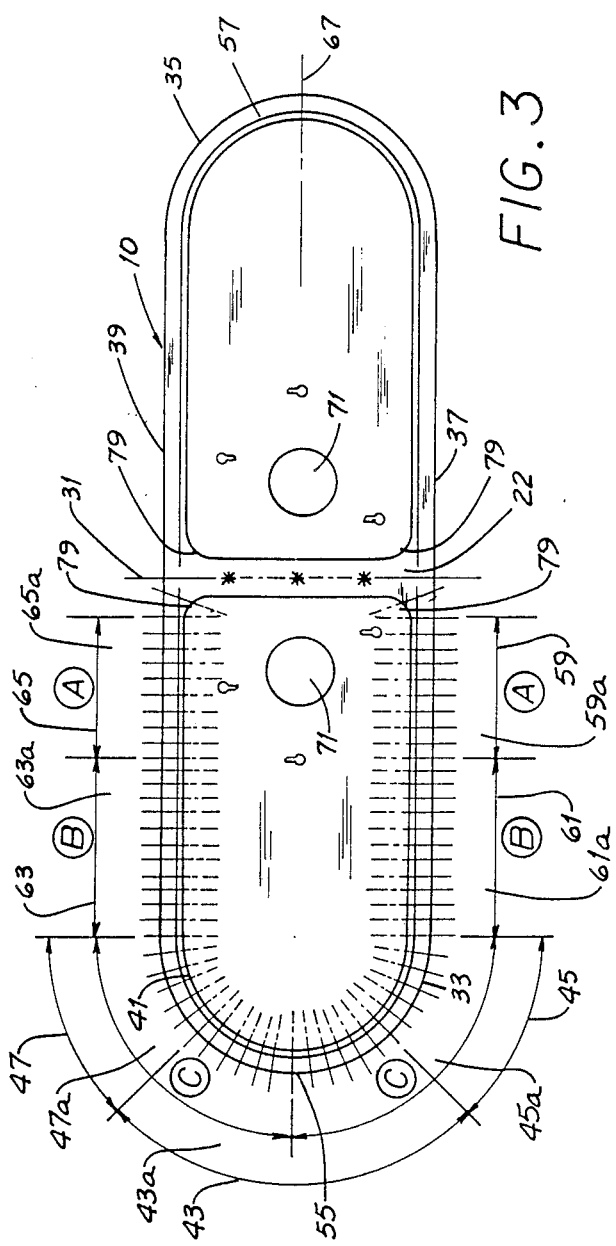
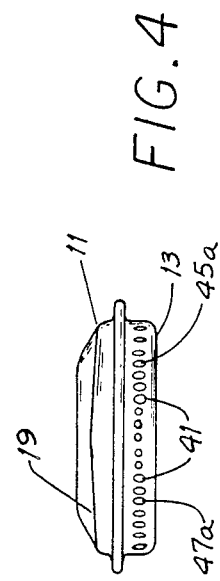

BAR BURNER

FIELD OF THE INVENTION

This invention is related generally to bar burners and, more particularly, to a bar burner of improved efficiency for use with a cooking grill wherein the temperature across the cooking surface is more nearly equalized.

BACKGROUND OF THE INVENTION

Grills including gas fired grills are popular and in wide use for cooking food. Such grills include a kettle which is frequently rectangular in shape and which has one or more burners mounted within it. Such burners are available in a number of configurations including bar burners, H-shaped burners and U-shaped burners. For example, U.S. Pat. No. 4,478,205 shows burners of the U-and H-shape types, U.S. Pat. Nos. 4,741,321 and 4,561,419 show bar burners and U.S. Pat. No. 4,705,020 shows a round burner.

Irrespective of the shape of the burner used within the grill, such grills often share a common problem. This problem is well illustrated by a rectangular kettle (the most common kettle shape) having within it a conventional bar burner. The cooking area is defined by a grill matrix made of wire or thin bars and placed atop the kettle and food is placed on this matrix for cooking.

Those areas of the cooking surface adjacent the corners of the kettle are located at a distance from the burner which is greater than those areas directly or nearly directly above the burner. The result is that those cooking areas nearer the corners of the kettle (and therefore farther from the burner) are at a much lower temperature than those areas near the center of the grill. For example, it is not unusual to experience differentials in temperature across the grill cooking surface which range from 130° F. to over 320° F. That is, the lowest temperature at the grill cooking surface may be 130° F. to over 320° F. lower than the highest temperature.

As a result, food distributed across the cooking surface cooks at a very uneven rate. This forces the grill user to serve food in sequential batches as cooking is completed or to periodically rearrange the food on the cooking surface so that all of the food is completely cooked at substantially the same time.

One factor which can aggravate and contribute to such temperature unevenness is that the burner itself "throws" or rejects heat unevenly with those portions of the burner nearer the inlet producing more heat than portions located farther from the inlet. This occurs because gas flowing from holes located more closely to the gas inlet is at a higher pressure and the flames produced thereby tend to be more robust. On the other hand, gas flowing from those holes located at the extremities of the burner, well away from the inlet, is at a lower pressure and the flames produced at such holes are "lazy" and reject less heat outward toward the adjacent cooking surface.

One known solution to the problem of uneven heat rejection involves the use of an interior baffle which prevents gas from flowing from the gas inlet port directly to those holes closest to such port. Instead, such gas is forced to flow along a serpentine path and the gas pressure at all of the holes tends to be more nearly equalized. As a consequence, the flames emanating from the holes tend to be more uniform in size and reject heat rather uniformly.

Another approach to the equalization of heat rejection is shown in U.S. Pat. No. 3,501,098 which shows a gas burner for a rotary dryer drum. The cylindrical burner shown therein is closed at each end and uses two horizontal rows of holes arranged one above the other and near the edge of an interior diametral baffle plate. Such holes face sideways along axes which are generally normal to the long axis of the burner. These holes, some of which face slightly upward and some of which face slightly downward, are nevertheless all "side facing" holes and are arranged in three zones on either side of the inlet. Such holes have diameters which increase with increases in distance of the zone from the centrally located fuel inlet. The holes within the zone nearest the inlet are spaced more closely together than are the holes in the other two zones and the flames emanating from all holes reject heat only in a sideways direction.

Another solution to the problem to non-uniform heat rejection is shown in U.S. Pat. No. 2,044,528. The Bunsen burner shown therein is designed to reject heat only in a upward direction. It has a progressively decreasing cross-sectional area (as viewed from the inlet toward the outer end) so that the burner gas holes are fed at a more nearly uniform gas pressure.

While such approaches reduce the problem of non-uniform heat rejection, they fail to adequately consider that certain areas of a cooking grill surface will nevertheless be at a substantially lower temperature even though heat is rejected rather uniformly from the burner itself. To state it another way, such heat is not sufficiently projected toward the extremities of the cooking surface such as the corners of a rectangular grill.

Another problem arising from burners of the "H," "U" and bar types illustrated in the aforementioned patents is that when such burners are mounted in a kettle, their top surfaces are generally horizontal and parallel to the cooking surface. Grease drippings and other types of debris inevitably fall to these top surfaces, often collecting in unsightly layers. In addition to the unsavory appearance presented by such debris, it often contains salt and can corrode and quickly destroy the burner unless regularly cleaned therefrom.

An improved burner which rejects heat in a manner to more nearly equalize the temperature across a grill cooking surface, which has improved efficiency, which tends to be self-cleaning of drippings and the like, which is devoid of baffles and otherwise easy to manufacture would be an important advance in the art.

OBJECTS OF THE INVENTION

It is an object of this invention to overcome some of the problems and shortcomings of the prior art.

Another object of this invention is to provide a bar burner which more nearly equalizes the temperature across the cooking surface of a grill.

Another object of this invention is to provide an improved burner which uses holes of varying cross-sectional areas for flowing gas therethrough.

Still another object of this invention is to provide a burner which exhibits a higher rate of heat rejection in the direction of the corners of a rectangular grill kettle in which it may be installed.

Another object of this invention is to provide a grill burner of the bar type which is easy to manufacture.

Yet another object of this invention is to provide a burner which tends to reject the by-products of cooking—drippings and the like—which may fall thereon.

Another object of this invention is to provide an improved burner which may be arranged in a single or dual cavity configuration.

These and other important objects will be apparent from the descriptions of this invention which follow.

SUMMARY OF THE INVENTION

In general, an improved bar burner is provided for use in a cooking grill having a top cooking area. The bar burner includes an elongate body having a pair of curved ends and a pair of substantially parallel sidewalls extending between the curved ends. A plurality of holes is distributed along each side wall for flowing combustible gas from the interior to the exterior of the body.

Each curved end also has a plurality of holes for flowing gas to the exterior of the body. The holes in each curved end are arranged to define an end zone and a pair of angularly facing or "angled" zones. The holes in the angled zones have enlarged cross-sectional areas, thereby providing improved heat rejection. In a highly preferred embodiment, the cross-sectional areas of the holes defining the angled zones are generally equal to one another and greater than the cross-sectional areas of the holes distributed along each side wall and in the end zones. When used in a rectangular burner kettle, the flames at the angled zones reject heat toward the kettle corners to more nearly equalize the temperature across the top cooking area.

Preferably, the body is formed using a lower pan which has an upwardly extending ridge arranged laterally across the pan at its midpoint. The pan is joined to an upper cover which has a downwardly extending crimp formed laterally therein to contact the ridge, thereby forming a barrier. The burner body is divided by the barrier into two cavities, each of which is fed by a separate gas inlet. However, reasonable performance results if the barrier is omitted to provide but a single burner cavity which is centrally fed by a single gas inlet. In either case, the cavities are devoid of baffles as such are unnecessary in the inventive burner.

For either configuration, the body may be said to have a pair of side walls, each of which defines a "U" shape and has a group of holes distributed along it. Each group defines seven zones arranged sequentially along a side wall with the holes in the first and seventh zones having a first, smaller cross-sectional area. The holes in the second and sixth zones have a second, intermediate cross-sectional area while those in the third and fifth zones have a third, larger cross-sectional areas. The holes in such third and fifth zones constitute the angled zones which face angularly outward for directing heat to the extremities of the grill.

In a highly preferred embodiment, the upper cover slopes downward from the burner midpoint toward each of the ends. As a result, the cross-sectional area of the interior cavity(ies) decreases from the burner midpoint toward each end. This decrease in cross-sectional area accelerates the gas flowing towards the ends of the burner and further improves flame intensity and burner heat rejection at the four angled zones.

As food, especially red meat, is cooked on the top cooking area, drippings and other by-products will fall to the burner below. The sloping upper cover causes such drippings and the like to run off of the burner and fall to the floor of the kettle. The life of the burner is thereby substantially improved. To further accelerate the flowing gas and aid the rejection of such by-products, it is preferred that the upper cover also slope toward the sides, i.e., laterally from the longitudinal burner axis.

BRIEF DESCRIPTION OF THE DRAWINGS

FIG. 1 is a top plan view of a first, dual cavity embodiment of the inventive burner.

FIG. 2 is a side elevation view of the burner of FIG. 1 taken along the viewing plane 2—2 thereof.

FIG. 3 is a bottom plan view of the burner of FIG. 1 taken along the viewing plane 3—3 of FIG. 2.

FIG. 4 is an end elevation of the burner of FIG. 1 taken along the viewing plane 4—4 thereof.

DETAILED DESCRIPTIONS OF PREFERRED EMBODIMENTS

The Figures show an improved bar burner 10 in accordance with the invention.

Figure 5:
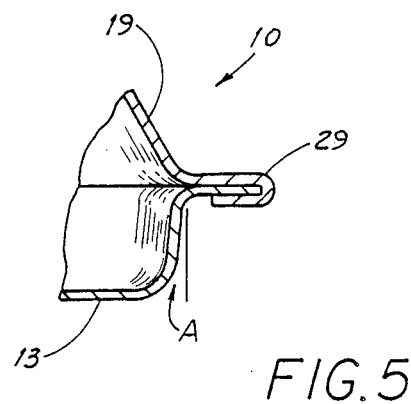
FIG. 5 is a cross-sectional view of a portion of the burner of FIG. 1 taken along the viewing plane 5—5 thereof and with parts broken away.

Referring first to FIGS. 1, 2 and 5, a highly preferred bar burner 10 is embodied as a hollow, elongate sheet metal body 11 having a lower pan 13 with a generally planar floor 15 and an upwardly extending ridge 17 formed in the pan 13 at its midpoint. When the lower pan 13 is finally formed, the side walls define an angle "A" of a few degrees with respect to the vertical as shown in FIG. 5.

An upper cover 19 is joined to the pan 13 and has a downwardly extending crimp 21 formed laterally therein to contact the ridge 17 and form a barrier 22 which divides the burner 10 to two cavities 23, 25. Such barrier 22 is substantially gas tight for complete isolation of each burner cavity 23, 25 and to that end, the ridge 17 and the crimp 21 are spot welded to one another at several points 27. The cover 19 and the pan 13 are joined together about the burner perimeter, preferably by crimping as shown in FIG. 5. However, spot or seam welding may also be used for such purpose and the resulting outwardly extending lip 29 helps prevent debris falling from the cooking area from lodging in the gas flow holes and clogging them.

Since the burner 10 is symmetrical about its lateral midpoint axis 31, the configuration of only the left half of the burner 10 shown in FIG. 3 will be described in detail. Referring additionally to FIGS. 3 and 4, the body 11 has a pair of curved ends 33, 35 with generally parallel side walls 37, 39 extending between such curved ends 33, 35. As to each half of the burner 10, the end (such as end 33 or end 35) and the walls 37, 39 define a "U" shape. In a highly preferred dual cavity embodiment, the continuity of each side wall 37, 39 is interrupted by the barrier 22 while in the single cavity embodiment (described below), each side wall 37, 39 runs substantially continuously.

Figure 7:
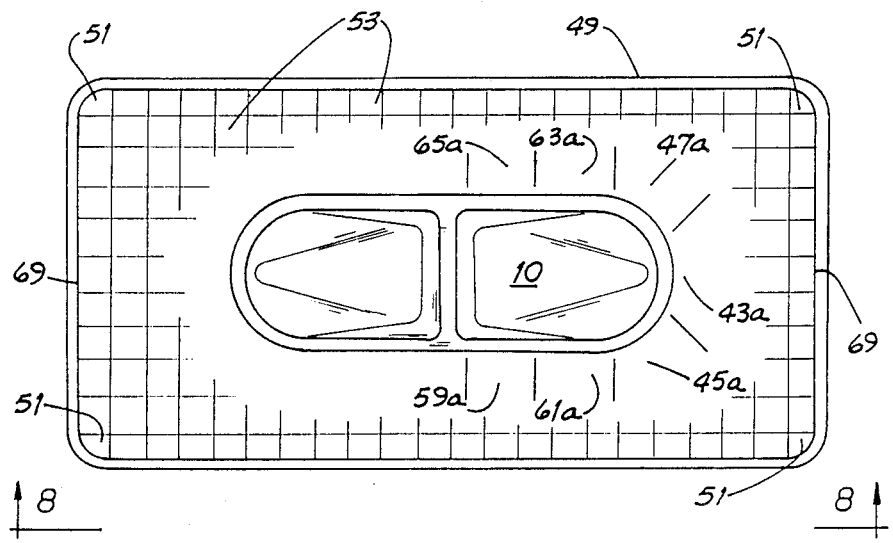
FIG. 7 is a top plan view of a rectangular kettle with the inventive burner mounted therein and with a grill matrix shown thereon, with parts broken away.

The body 11 has a plurality of holes 41 distributed along the side walls 37, 39 and about each curved end 33, 35. Certain of such holes 41, those spanned by the arrow 43, define the end zone 43a while other of such holes 41 define a pair of angled zones 45a, 47a as spanned by the arrows 45 and 47 respectively. The holes 41 in the angled zones 45a, 47a have enlarged cross-sectional areas resulting in a hotter, more robust flame being projected from such holes 41. Heat rejection toward the corners 51 of a rectangular kettle 49 is thereby improved and the temperature across the top cooking area 53 is more nearly equalized. Typically, the burner 10 will be installed in a kettle 49 in a position shown in FIGS. 7 and 8. That is, the burner 10 will be substantially centered within the kettle 49 both longitudinally and laterally. With such a mounting arrangement, the angled zones 45a, 47a and their respective adjacent kettle corners 51 will be about the same distance from one another. Assuming such a mounting arrangement (the typical case), the cross-sectional areas of the holes 41 defining the angled zones 45a, 47a are generally equal to one another. As a result, the amount of heat "thrown" or rejected toward each kettle corner 51 (and the related portion of the adjacent cooking area 53) is approximately equal for all corners 51. Further, the holes 41 which define the angled zones 45a, 47a have a larger cross-sectional area than the area of the holes 41 distributed along the side walls 37, 39 and than those holes 41 which define the end zones 43a.

The locations of the angled zones 45a, 47a and the end zone 43a have been described above. However, the holes 41 in each half of the burner 10 define several other zones which will now be described. Referring particularly to FIGS. 2 and 3, the holes 41 in each U-shaped wall 55, 57 (comprised of, for example, curved end 33 and portions of side walls 37 and 39) are arranged to define seven sequentially arranged zones 59a, 61a, 45a, 43a, 47a, 63a and 65a. Such zones are spanned by arrows 59, 61, 45, 43, 47, 63 and 65, respectively. The holes 41 in the first zone 59a and the seventh zone 65a have a first, smaller cross-sectional area, those in the second zone 61a and the sixth zone 63a have a second, intermediate cross-sectional area while those in the third zone 45a and the fifth zone 47a have a third, larger cross-sectional area. It should be understood that for purposes of this explanation, the angled zones 45a, 47a are the third and fifth zones while the end to zone 43a is the fourth zone.

It is to be noted that the holes 41 in the fourth zone 45a face outward in a direction generally parallel to the longitudinal axis 67 of the burner 10. The cross-sectional area of each of the holes 41 in this fourth zone 43a is less than the cross-sectional area of each of the holes 41 in the third and fifth zones 45a, 47a. Such an arrangement is selected in anticipation of the mounting arrangement of FIG. 7 wherein the spacing between the ends of the bar burner and the adjacent kettle end panel 69 is less than the spacing between the third zone 45a and its nearby corner 51.

From the foregoing, it will be understood that the holes 41 which define the angled zones 45a, 47a each have a cross-sectional area which is larger than that of the holes in the other zones 59a, 61a, 43a, 63a, 65a. This feature alone provides robust flames directed toward the corners 51 of a rectangular kettle 49 in which the burner 10 is mounted. However, even better heat rejection and efficiency results if the gas flowing from the inlet is accelerated as it flows toward each end of the burner 10.

Accordingly and in a highly preferred embodiment which is best seen in FIGS. 2 and 3, the upper cover 19 slopes downward toward each end 33, 35 of the burner 10. As a result, the cross-sectional area of each cavity 23, 25 (as viewed along a vertical plane) diminishes from the axis 31 toward each end 33, 35. Gas flowing into each inlet 71 (see FIG. 3) is thereby accelerated toward the burner end 33 and 35. Another benefit arising from such sloping cover construction is that cooking by-products which fall onto the cover 19 are rejected by running off of the sloping surface.

Referring next to FIGS. 1, 2 and 4, it is also preferred that the upper cover 19 slope from the longitudinal axis 67 downward and outward toward the angled zones 45a, 47a of the burner 10. Such slope will also aid in rejecting by-products which fall on the upper cover 19.

A highly preferred method of manufacturing the inventive burner 10 involves piercing holes in a flat sheet of metal and then drawing such sheet into the shape shown in the figures to provide the lower pan 13. When using this approach, it is important to appreciate the effect of the drawing process upon the cross-sectional areas of the holes 41. Prior to shaping the lower pan 13 by drawing, holes are pierced in the generally flat blank (not shown) and define six piercing regions involving three pairs of two regions each. These regions are shown with respect to the finished pan of FIG. 3. In a highly preferred embodiment, the holes in regions "A" are pierced to a diameter of 0.078 inches, those in regions "B" to a diameter of 0.098 inches and those in regions "C" to a diameter of 0.100 inches. Notwithstanding that the diameters of the pierced holes in regions "C", (each of which has an arc width of about 90°) extending around the entire curved end 33 of the burner 10, are the same size prior to drawing, the drawing operation will cause the finished size of the holes 41 in the third and fifth zones 45a, 47a to be larger than those holes 41 in the fourth zone 43a. In fact, the holes 41 in the third and fifth zones 45a, 47a will be somewhat elliptical as a result of the drawing operation and this is shown in FIG. 4 for the end 35 of the burner 10.

Figure 6:
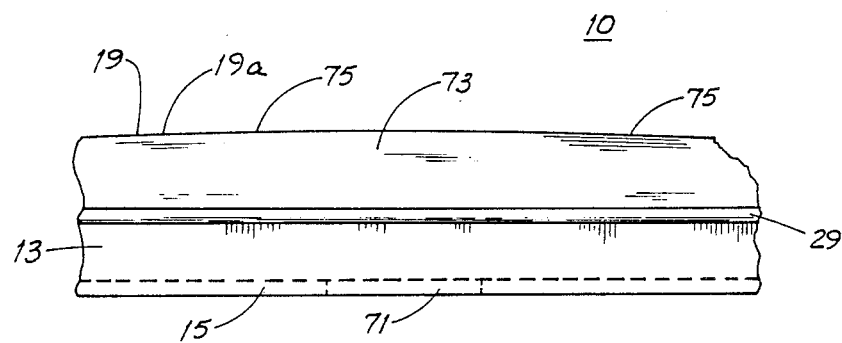
FIG. 6 is a side elevation view of a second, non-tapered single cavity embodiment of the inventive burner viewed from the perspective of FIG. 2, with parts broken away and other parts shown in phantom view.

Referring particularly to FIGS. 2 and 6, it is to be appreciated that the bar burner 10 may be configured to have two isolated cavities 23, 25 as shown in FIG. 2 which is the highly preferred embodiment. It may also be configured to omit the barrier 22 as shown in FIG. 6, thereby resulting in a burner 10 which has a single cavity 73 over its entire length and a single, centrally located gas inlet 71.

Referring again to FIG. 6 and in yet another embodiment, the top surface(s) 75 of the cover 19a are generally parallel to the floor 15 of the pan 13, irrespective of whether the burner 10 is of the single cavity or dual cavity type. However, in this configuration the top surface(s) 75 of the cover 19 will be generally horizontal when the burner 10 is installed in a kettle 49 and drippings and other by-products of the cooking process will cling to such surface(s) 75.

Figure 8:
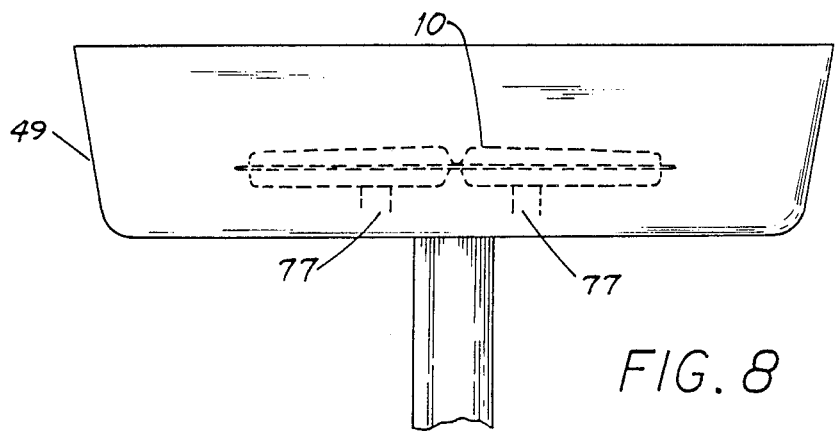
FIG. 8 is a side elevation view of the kettle of FIG. 7 taken along the view plane 8—8 thereof and with the burner and gas inlets shown in phantom view dotted outline.

In use, the burner 10 is mounted in a kettle 49 and one or two gas sources 77, as the case may be, connected to the single inlet 71 (see FIG. 6) or the two inlets 71 (see FIG. 3). In the arrangement of FIGS. 3 and 8, either half of the burner 10 may be used alone to permit cooking over approximately one half of the cooking area 53. However, it is more common to use both halves of the burner 10. When doing so, grill users find it convenient to ignite the gas flowing from all of the holes 41 by merely touching a match to one area of the burner 10. "Cross over ignition" is facilitated by four cross over gas holes 79 located adjacent the barrier 22 in the positions shown in FIG. 3. A flame emanating from any one of these cross over holes 79 will ignite the raw gas flowing from the adjacent cross over hole 79. One may thereby ignite the entire burner by applying a match to only a single location thereof. Such cross over holes 79 are known per se.

In the highly preferred embodiment described above, i.e., having dual cavities 23, 25 and a sloping cover 19, the temperature differential across the entire cooking area 53 is in the range of 70° F. This is a marked improvement over the 130° F. to 320° F. differential as often occurs with conventional burners. As a result, it is not necessary to periodically rearrange food to cause it to finish cooking at the same time and the user can avoid the inconvenience of having to serve fully cooked food in batches.

In addition to the benefits of more nearly equalized temperature distribution across the cooking area 53 and a burner 10 which rejects cooking by-products dropped thereon, the inventive burner 10 provides yet another benefit, namely, improved efficiency. A conventional bar burner of a given physical size and having holes of substantially uniform cross-sectional area and an upper cover and lower pan which are generally parallel to one another provides an output of 26,000 to 27,000 BTU. An inventive bar burner 10 of the same general physical size but configured as shown and described in the highly preferred embodiment provides about 34,000 BTU output. Further, the material cost relating to such inventive burner 10 is somewhat less than that required to make the conventional burner.

Such improved efficiency has important implications. One is that for a given BTU output requirement, the inventive burner 10 can be made in a somewhat smaller size than a conventional burner having the same output. Material and overall manufacturing costs are therefore reduced. Conversely, an inventive burner 10 of a particular size can be used in a larger kettle than was heretofore possible with a conventional burner of the same size. Even so, such inventive burner 10 provides more nearly equalized temperatures across the entirety of the cooking area 53.

While the principles of this invention have been described in connection with specific embodiments, it should be understood clearly that these descriptions are made only by way of example and are not intended to limit the scope of the invention.

What is claimed is:

1. An improved bar burner for use in a cooking grill having a top cooking area, such bar burner including:
   an elongate body having a pair of curved ends, a pair of substantially parallel side walls extending between such curved ends and a plurality of holes distributed along each side wall for flowing combustible gas therethrough;
   each curved end also having a plurality of holes for flowing combustible gas therethrough, such holes being arranged to define an end zone and a pair of angled zones;
   the holes in the angled zones having enlarged cross sectional areas, thereby providing improved heat rejection for more nearly equalizing the temperature across the top cooking area.

2. The bar burner of claim 1 wherein the cross sectional areas of the holes defining the angled zones are generally equal one to the other.

3. The bar burner of claim 2 wherein the cross sectional areas of the holes defining the angled zones are greater than the cross sectional areas of the holes distributed along each side wall.

4. The bar burner of claim 3 wherein the cross sectional areas of the holes defining the angled zones are greater than the cross sectional areas of the holes defining the end zones.

5. The bar burner of claim 4 wherein the elongate body includes a barrier formed laterally thereacross and located generally midway between the ends, the body thereby being divided to two cavities, each such cavity having a gas inlet port.

6. An improved bar burner for installation in a cooking grill having a top cooking area, such bar burner including:
   a hollow, elongate body having a pair of U-shaped walls;
   a group of holes distributed along each such wall for flowing combustible gas therethrough, each such group defining seven zones arranged sequentially along such wall, the holes in the first and seventh zones having a first, smaller cross-sectional area, the holes in the second and sixth zones having a second, intermediate cross-sectional area, the holes in the third and fifth zones having a third, larger cross-sectional area;
   the holes in the third and fifth zones facing angularly outward for directing heat to the extremities of the grill, thereby more nearly equalizing temperatures across the top cooking area.

7. The bar burner of claim 6 wherein the body has a longitudinal axis and wherein the holes in the fourth zone face outward in a direction generally parallel to the longitudinal axis and have cross-sectional areas less than the cross-sectional areas of the holes in the third and fifth zones.

8. The bar burner of claim 7 wherein the body has an interior cavity, a pair of spaced ends and a midpoint which is generally equidistant between the ends and wherein the cross-sectional area of the cavity decreases from the midpoint to each end, thereby accelerating the gas flowing toward such ends.

9. The bar burner of claim 8 wherein the body includes an upper cover which slopes downward toward each of the ends, thereby providing such decrease in cross-sectional area of the cavity.

10. The bar burner of claim 9 further including a lower pan joined to the cover, the pan having an upwardly extending ridge formed laterally therein at the midpoint, the cover having a downwardly extending crimp formed laterally therein to contact the ridge, thereby forming a barrier which divides the burner to two sections.

11. The bar burner of claim 10 wherein the body has generally parallel sides and wherein the upper cover slopes from the longitudinal axis downward toward the sides, thereby causing the burner to reject by-products of cooking which may fall thereon.

* * * * *